United States Patent [19]

Yamaguchi et al.

[11] Patent Number: 4,881,373
[45] Date of Patent: Nov. 21, 1989

[54] PULSE COMBUSTION DEVICE

[75] Inventors: Shigeki Yamaguchi; Norio Ohiwa; Katsusuke Ishiguro, all of Nagoya, Japan

[73] Assignee: Paloma Kogyo Kabushiki Kaisha, Nagoya, Japan

[21] Appl. No.: 185,423

[22] Filed: Apr. 25, 1988

[51] Int. Cl.$^4$ ................................................ F23R 7/00
[52] U.S. Cl. ...................................... 60/732; 60/39.76; 431/1
[58] Field of Search ........................ 60/732, 737, 39.29, 60/39.76, 39.77, 39.8; 431/1, 18, 158

[56] References Cited

U.S. PATENT DOCUMENTS

| | | | |
|---|---|---|---|
| 2,898,978 | 8/1959 | Kitchen et al. | 60/39.77 |
| 3,005,485 | 10/1961 | Salgo et al. | 60/39.77 |
| 3,091,224 | 5/1963 | Rydberg | 431/1 |
| 3,925,981 | 12/1975 | Etessam | 60/39.77 |
| 4,171,612 | 10/1979 | Zwick | 60/39.29 |
| 4,255,927 | 3/1981 | Johnson et al. | 60/39.29 |
| 4,260,361 | 4/1981 | Huber | 60/39.77 |
| 4,309,977 | 1/1982 | Kitchen | 431/1 |
| 4,314,444 | 2/1982 | Putnam et al. | 60/39.77 |
| 4,412,414 | 11/1983 | Novick et al. | 60/39.29 |
| 4,472,132 | 9/1984 | Hisaoka | 431/1 |
| 4,634,731 | 1/1987 | Bader | 60/39.76 |
| 4,671,069 | 6/1987 | Sato et al. | 60/737 |
| 4,715,807 | 12/1987 | Yokoyama et al. | 60/39.8 |
| 4,767,313 | 8/1988 | Lockwood, Jr. | 60/39.76 |
| 4,808,107 | 2/1989 | Yokoyama | 431/1 |

FOREIGN PATENT DOCUMENTS

| | | | |
|---|---|---|---|
| 0157372 | 10/1985 | European Pat. Off. | 431/1 |
| 1240612 | 5/1967 | Fed. Rep. of Germany | 431/1 |

Primary Examiner—Louis J. Casaregola
Assistant Examiner—Timothy S. Thorpe
Attorney, Agent, or Firm—Berman, Aisenberg & Platt

[57] ABSTRACT

A pulse combustion device having a mixing chamber arranged to be supplied with primary air and gaseous fuel, and a combustion chamber which is supplied with a mixture of gaseous fuel and air from the mixing chamber to take place pulse combustion of the mixture therein. The pulse combustion device includes an air intake system which is composed of a primary air intake system for adjusting an amount of primary air supplied into the mixing chamber to create a rich mixture of gaseous fuel and primary air in the mixing chamber, and a secondary air intake system for supplying secondary air into the combustion chamber and for adjusting an amount of the secondary air to be mixed with the rich mixture in the combustion chamber.

13 Claims, 3 Drawing Sheets

PULSE COMBUSTION DEVICE

BACKGROUND OF THE INVENTION

1. Field of the Invention

The present invention relates to pulse combustion devices using flapper-type gas and air inlet valves, and more particularly to an improvement of an air intake system in the pulse combustion device.

2. Description of the Prior Art

In a conventional pulse combustion device of this kind, flapper-type gas and air inlet valves are adapted to supply gaseous fuel and air at an optimum mixing ratio into a combustion chamber, and a tailpipe is connected to the combustion chamber to bring about therein pulse combustion of the mixture of gaseous fuel and air and to exhaust therefrom the combustion products. In FIG. 3 there is illustrated such a conventional pulse combustion device as described above which comprises a housing 8' forming therein a combustion chamber 10' and being provided thereon with a spark plug 13', a cylindrical support member 5' coupled in a fluid-tight manner with an open end of housing 8' through a perforated flame trap 11' and forming therein a mixing chamber 4', a partition member $1a'$ secured to a flanged open end of support member 5' and defining a side wall of an air chamber 1', a cylindrical gas distribution head 3' mounted in the center of partition member $1a'$ and having an inner end portion formed with a plurality of circumferentially spaced radial holes $3a'$ for communication with the mixing chamber 4', a gas container 2' arranged within the air chamber 1' to store therein an amount of gaseous fuel under pressure and having a cylindrical projection $2a'$ coupled within the distribution head 3' in a fluid-tight manner, a plurality of circumferentially equally spaced flapper-type air inlet valve units $V_1'$ mounted on the partition member $1a'$ to allow inward flow of air passing therethrough into the mixing chamber 4' from the air chamber 1' and to block outward flow of the air from the mixing chamber 4', a flapper-type gas inlet valve unit $V_3'$ mounted on an end wall of the cylindrical projection $2a'$ of container 2' and arranged within the distribution head 3' to allow inward flow of gaseous fuel passing therethrough into the mixing chamber 4' from the gas container 1' and to block outward flow of the gaseous fuel from the mixing chamber 4'.

In operation of the conventional pulse combustion device, gaseous fuel under pressure is supplied into the mixing chamber 4' from the gas container 2' through the gas inlet valve unit $V_3'$ and distribution head 3', while air is supplied into the mixing chamber 4' from the air chamber 1' through the air inlet valve units $V_1'$. The gaseous fuel is mixed with the incoming air at an optimum mixing ratio in the mixing chamber 4' and supplied into the combustion chamber 10' through the flame trap 11'. When the mixture of gaseous fuel and air is iginited by energization of the spark plug 13', the pressure of the resulting rapid combustion of the mixture closes the air and gas inlet valve units $V_1'$, $V_3'$ and forces the combustion products to exhaust from the tailpipe. During combustion of the mixture in the combustion chamber 10', the mixture is explosively burnt in a moment when introduced into the combustion chamber 10'. This results in an increase of combustion noise in the combustion chamber 10'. Moreover, it is difficult to increase or decrease heating capacity of the pulse combustion device by adjustment of the supply amount of gaseous fuel into the mixing chamber 4'. Namely, the adjustment range of heating capacity is very narrow. For these reasons, the application of the pulse combustion device is limited only to a gas equipment such as a gas fryer which requires no change of its heating capacity during operation.

SUMMARY OF THE INVENTION

It is, therefore, a primary object of the present invention to provide an improved air intake system for the pulse combustion device which is capable of adjusting heating capacity of the device in a wide range without causing unpleasant combustion noise during operation of the device.

According to the present invention, the primary object is attained by providing a pulse combustion device having a mixing chamber arranged to be supplied with primary air and gaseous fuel, and a combustion chamber which is supplied with a mixture of gaseous fuel and air from the mixing chamber to take place pulse combustion of the mixture therein, which combustion device comprises an air intake system composed of a primary air intake system for adjusting an amount of primary air supplied into the mixing chamber to create a rich mixture of gaseous fuel and primary air in the mixing chamber, and a secondary air intake system for supplying secondary air into the combustion chamber and for adjusting an amount of the secondary air to be mixed with the rich mixture in the combustion chamber.

BRIEF DESCRIPTION OF THE DRAWINGS

Other objects, features and advantages of the present invention will become more readily apparent from the following detailed description of certain preferred embodiments thereof when considered with reference to the accompanying drawings, in which.

DESCRIPTION OF THE PREFERRED EMBODIMENTS

Figure 1:
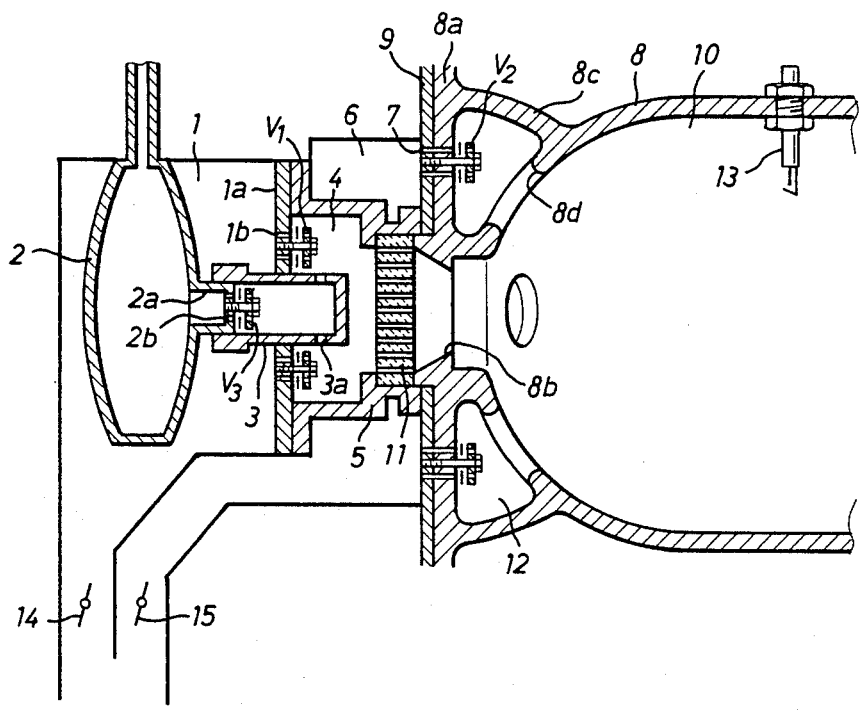
FIG. 1 is a schematic sectional view of a pulse combustion device in accordance with the present invention.

Referring now to the drawings, FIG. 1 illustrates a pulse combustion device equipped with an air intake system in accordance with the present invention. The pulse combustion device includes a housing 8 forming therein a combustion chamber 10 and provided thereon with a spark plug 13, a cylindrical support member 5 coupled in a fluid-tight manner with a stepped open end of housing 8 through a perforated flame trap 11 and forming therein a mixing chamber 4, and a partition member $1a$ secured to a flanged open end of support member 5 and defining a side wall of a primary air chamber 1, the partition member $1a$ being formed with a plurality of circumferentially equally spaced valve holes $1b$ for communication between the primary air chamber 1 and mixing chamber 4. The pulse combustion device further includes a cylindrical gas distribution head 3 mounted in the center of partition member $1a$ and having an inner end portion formed with a plurality of circumferentially spaced radial holes $3a$ for communication with the mixing chamber 4, a gas container 2 arranged within the primary air chamber 1 and connected to a source of gaseous fuel (not shown) to store therein an amount of gaseous flue under pressure and having a cylindrical projection 2a coupled within the distribution head 3 in a fluid-tight manner, the cylindrical projection 2a having an end wall formed with valve holes 2b, a plurality of circumferentially equally spaced flapper-type primary air inlet valve units $V_1$ mounted on the partition member 1a to allow inward flow of the primary air passing therethrough into the mixing chamber 4 from the primary air chamber 1, and a flapper-type gas inlet valve unit $V_3$ mounted on the end wall of cylindrical projection 2a and arranged within the distribution head 3 to allow inward flow of gaseous fuel passing therethrough into the mixing chamber 4 from the gas container 2 and to block outward flow of the gaseous fuel from the mixing chamber 4.

Figure 3:
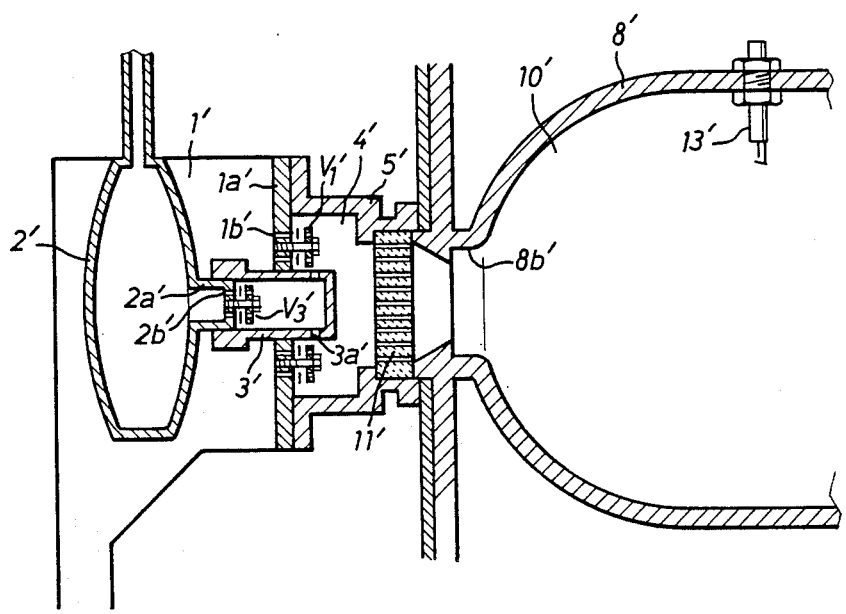
FIG. 3 is a schematic sectional view of a conventional pulse combustion device.

The housing 8 is disposed within a cooking vessel or pot 9 a portion of which is illustrated in the figure and has an end wall 8a secured in a fluid-tight manner to a side wall of the vessel 9. The end wall 8a of housing 8 is formed with an aperture 8b which is aligned with the flame trap 11 and distribution head 3. The housing 8 has another end wall (not shown) forming the combustion chamber 10 and supporting a tailpipe (not shown) connected thereto in a fluid-tight manner. The tailpipe is fully immersed in an amount of liquid such as cooking oil or water stored in the vessel 9. The tailpipe is arranged to receive combustion products from the combustion chamber 10 and extends outwardly from another side wall of the vessel 9 to deliver the combustion products to an exhaust. The flame trap 11 is made of heat resisting material such as a ceramic material. The structure described above is substantially the same as that of the conventional pulse combustion device illustrated in FIG. 3.

In the pulse combustion device of the present invention, the primary air chamber 1 is connected to a first air duct in which a first air damper 14 is disposed to adjust an amount of primary air supplied into the air chamber 1. The first air duct is arranged to be forcibly supplied with the primary air during operation of a blower (not shown) connected thereto. An annular secondary air chamber 6 is provided in surrounding relationship with the cylindrical support member 5. The secondary air chamber 6 is connected to a second air duct in which a second air damper 15 is disposed to adjust an amount of secondary air supplied into the secondary air chamber 6. Similarly to the first air duct, the second air duct is arranged to be forcibly supplied with the secondary air during operation of the blower connected thereto. The housing 8 has a hollow peripheral wall 8c forming therein an annular cavity 12 for communiation with the secondary air chamber 6. The annular cavity 12 is in open communication with the interior of combustion chamber 10 through a plurality of circumferentially equally spaced ports 8d formed in an interanl wall of housing 8. The end wall 8a of housing 8 and the side wall of vessel 9 are formed with a plurality of circumferentially equally spaced valve holes 7 for communication between the secondary air chamber 6 and cavity 12. Within the interior of cavity 12, a plurality of circumferentially equally spaced valve units $V_2$ are mounted on the end wall 8a of housing 8 to allow inward flow of the secondary air passing therethrough into the cavity 12 from the secondary air chamber 6 and to block outward flow of the secondary air from the cavity 12.

From the above description, it will be understood that the air intake system of the present invention is composed of a primary air supply system including the primary air damper 14, chamber 1 and inlet valve units $V_1$ and a secondary air supply system including the secondary air damper 15, chamber 6, inlet valve units $V_2$, cavity 12 and ports 8d. In such arrangement of the air intake system, the primary air damper 14 is preliminarily positioned to adjust the amount of primary air supplied into the primary air chamber 1 in accordance with the component of gaseous fuel in order to create a rich mixture of gaseous fuel and primary air in the mixing chamber 4. In a practical embodiment, it is desirable that the supply amount of primary air is adjusted to approximately one third or one fourth of the air amount necessary for effecting complete combustion of the gaseous fuel in the combustion chamber 10.

In operation of the pulse combustion device, the blower is driven to forcibly supply the primary air into chamber 1 under control of the primary air damper 14, and in turn, the supplied primary air is mixed with the gaseous fuel from gas container 2 in the mixing chamber 4 to create a rich mixture of gaseous fuel and air. Thus, the combustion chamber 10 is supplied with the rich mixture from the mixing chamber 4 through flame trap 11 and is supplied with the secondary air from chamber 6 under control of the secondary air damper 15. The rich mixture is mixed at an optimum mixing ratio with the secondary air in the combustion chamber 10 to be iginited by energization of the spark plug 13. Upon energization of the spark plug 13, the mixture of fuel gaseous and air is ignited, and in turn, the pressure of the resulting combustion of the mixture closes the air inlet valve units $V_1$, $V_2$ and gas inlet valve unit V and forces the combustion products to exhaust from the tailpipe (not shown). When pulse combustion is initiated, oscillation takes place in the tailpipe, creating alternate positive and negative pressures in the tailpipe. During periods of negative pressure in the combustion chamber 10, the primary air and gas inlet valve units $V_1$, $V_3$ are opened to create a fresh rich mixture of gaseous fuel and air in the mixing chamber 4, and simultaneously the secondary air inlet valve units $V_2$ are opened to introduce a fresh secondary air into the combustion chamber 10. The rich mixture is mixed with the secondary air in the combustion chamber 10 and reignited by a flame caused by the pulse combustion. During intermittent periods of position pressure in the combustion chamber 10, the air and gas inlet valve units $V_1$, $V_2$ and $V_3$ are closed. After initiation of the reignition of the mixture, the blower is stopped.

Figure 2:
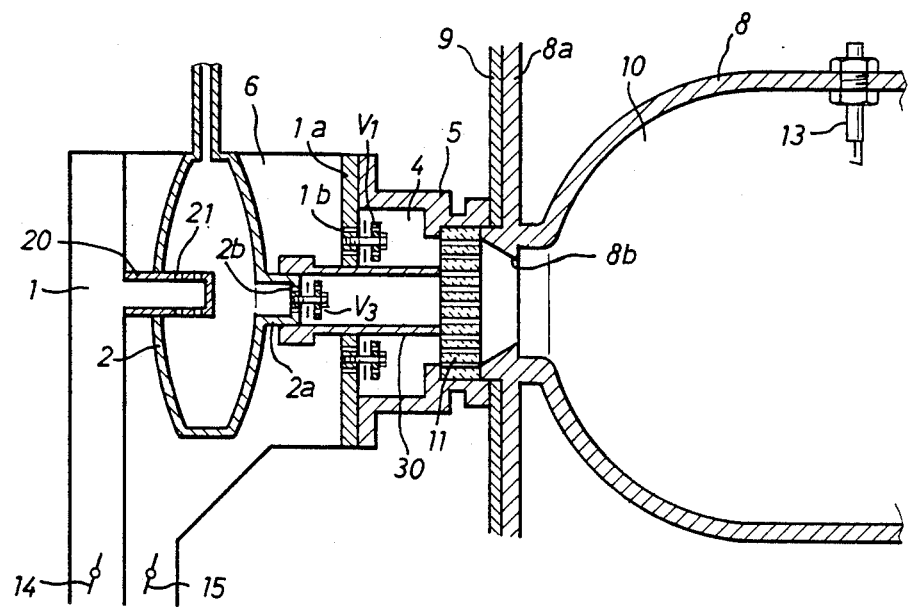
FIG. 2 is a schematic sectional view of a modification of the pulse combustion device.

In FIG. 2 there is illustrated a modification of the pulse combustion device described above, wherein the gas distribution head 3 is replaced with a gas distribution head 30 which has an inner open end engaged with the flame trap 11, the air chamber 1 is arranged to be supplied with the secondary air under control of the air damper 15, and the air inlet valve units $V_1$ are arranged to allow inward flow of the secondary air passing therethrough into the mixing chamber 4 from the air chamber 1. In this modification, the gas container 2 is provided therein with a primary air intake head 20 which is mounted on a peripheral wall of container 2 to introduce therethrough the primary air into the gas container 2 from the primary air chamber 1 under control of the air damper 14. In addition, the air intake head 20 is formed with a plurality of circumferentially equally spaced radial holes 21 for communication with the interior of gas container 2, and the hollow peripheral wall 8c of housing 8 and related components and portions are eliminated. The other construction and components are substantially the same as those in the pulse combustion device described above.

In operation of the modification, the primary air is supplied into the gas container 2 through air intake head 20 under control of the air damper 14 to create a rich mixture of gaseous fuel and primary air in the container 2, while the secondary air is supplied into the mixing chamber 4 through the air inlet valve units $V_1$ under control of the air damper 15. Thus, the rich mixture is supplied into the combustion chamber 10 through the gas inlet valve unit $V_3$, distribution head 3 and flame trap 11 and is mixed with the secondary air supplied into the combustion chamber 10 through the flame trap 11. The function of the modification is substantially the same as that of the pulse combustion device described above.

Having now fully set forth both structures and operation of certain preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A pulse combustion device comprising a housing forming therein a combustion chamber in which pulse combustion of a mixture of gaseous fuel and air takes place, a cylindrical support member coupled with said housing to form a mixing chamber in open communication with said combustion chamber, and a gas container arranged to store an amount of gaseous fuel and connected to said mixing chamber to supply the gaseous fuel therefrom into said combustion chamber through said mixing chamber, wherein the pulse combustion device further comprises an air intake system composed of a primary air supply system including means for supplying primary air into said mixing chamber and means for adjusting a supply amount of the primary air in such manner as to create a rich mixture of gaseous fuel and primary air in said mixing chamber, and a secondary air supply system including means for supplying secondary air into said combustion chamber and means for adjusting a supply amount of the second air to be mixed with the rich mixture supplied into said combustion chamber from said mixing chamber, whereby valve means for regulating flow of said rich mixture and said secondary air are controlled according to actuation of ignition means for burning the mixture in the combustion chamber, thereby providing pulse combustion of the mixture in the combustion chamber.

2. A pulse combustion device according to claim 1, wherein said means for adjusting a supply amount of primary air is arranged to adjust the supply amount of the primary air to approximately one third or one fourth of the air amount necessary for effecting complete combustion of the gaseous fuel in said combustion chamber.

3. A pulse combustion device according to claim 1, wherein a primary air chamber is provided in communication with said mixing chamber through flapper-type primary air inlet valve means, said gas container being arranged in said primary air chamber, and wherein said means for supplying primary air into said mixing chamber is a primary air duct connected to said primary air chamber, and means for adjusting a supply amount of the primary air is an air damper disposed in said primary air duct.

4. A pulse combustion device according to claim 1, wherein an annular secondary air chamber is provided in surrounding relationship with said support member, and said housing has a hollow peripheral wall forming therein an annular cavity for communication with said secondary air chamber through flapper-type secondary air inlet valve means, said annular cavity being in open communication with the interior of said combustion chamber through a plurality of circumferentially spaced ports formed in an internal semi-spherical end wall of said housing, and wherein said means for supplying secondary air into said combustion chamber is a secondary air duct connected to said secondary air chamber, and means for adjusting a supply amount of the secondary air is an air damper disposed in said secondary air duct.

5. A pulse combustion device comprising a housing forming therein a combustion chamber in which pulse combustion of a mixture of gaseous fuel and air takes place, and a gas container arranged to store an amount of gaseous fuel supplied thereinto from a source of gaseous fuel and connected to said combustion chamber to directly supply the gaseous fuel therefrom into said combustion chamber, wherein the pulse combustion device further comprises an air intake system composed of a primary air supply system including means for supplying primary air into said gas container and means for adjusting a supply amount of the primary air to create a rich mixture of gaseous fuel and primary air in said gas container, and a secondary air supply system including means for supplying secondary air into said combustion chamber and means for adjusting a supply amount of the secondary air to be mixed with the rich mixture supplied into said combustion chamber from said gas container, whereby valve means for regulating flow of said rich mixture and said secondary air are controlled according to actuation of ignition means for burning the mixture in the combustion chamber, thereby providing pulse combustion of the mixture in the combustion chamber.

6. A pulse combustion device according to claim 5, wherein said means for adjusting a supply amount of the primary air is arranged to adjust the supply amount of the primary air to approximately one third or one fourth of the air amount necessary for effecting complete combustion of the gaseous fuel in said combustion chamber.

7. A pulse combustion device according to claim 5, wherein a primary air chamber is provided in communication with said gas container, and wherein said means for supplying primary air into said gas container is a primary air duct connected to said primary air chamber, and means for adjusting a supply amount of the primary air is an air damper disposed in said primary duct.

8. A pulse combustion device according to claim 5, further comprising a cylindrical support member coupled with said housing to form an internal air chamber in open communication with said combustion chamber, and a secondary air chamber provided in communication with said internal air chamber through flapper-type secondary air inlet valve means, wherein said means for supplying secondary air into said combustion chamber is a secondary air duct connected to said secondary air chamber, and means for adjusting a supply amount of the secondary air is an air damper disposed in said second air duct.

9. A pulse combustion device comprising an air intake system for enabling pulsed combustion in a combustion chamber, said air intake system including a primary air supply system and a secondary air supply system, said device comprising:

means for receiving primary air and gaseous fuel for forming a rich mixture thereof, wherein said primary air is received in a regulated amount from the primary air supply system;

means for adding secondary air to said rich mixture, wherein said secondary air is received in a regulated amount from the secondary air supply system; and ignition means in the combustion chamber for pulse combustion of said mixture of secondary air and said rich mixture, wherein flapper-type valve means for controlling supply of said rich mixture and said secondary air are activated responsively according to actuation of said ignition means.

10. A pulse combustion device according to claim 9 wherein the means for receiving the primary air and gaseous air and gaseous fuel is a mixing chamber wherein the rich mixture is formed.

11. A pulse combustion device according to claim 10 wherein the secondary air and the rich mixture are mixed together in the combustion chamber.

12. A pulse combustion device according to claim 9 wherein the primary air is received in a container for the gaseous fuel and the rich mixture is formed therein.

13. A pulse combustion device according claim 12 wherein the secondary air and the rich mixture air are mixed together in the combustion chamber.

* * * * *